(12) United States Patent  
Abella

(10) Patent No.: US 7,104,855 B1  
(45) Date of Patent: *Sep. 12, 2006

(54) NOZZLE DRIVE PROPULSION FOR A MARINE CRAFT

(76) Inventor: Jose Abella, 5121 E. 2nd Ave., Hialeah, FL (US) 33013

(*) Notice: Subject to any disclaimer, the term of this patent is extended or adjusted under 35 U.S.C. 154(b) by 0 days.

This patent is subject to a terminal disclaimer.

(21) Appl. No.: 11/042,828

(22) Filed: Jan. 25, 2005

Related U.S. Application Data

(63) Continuation-in-part of application No. 10/405,325, filed on Apr. 2, 2003, now Pat. No. 6,846,210.

(51) Int. Cl.  
*B63H 5/15* (2006.01)

(52) U.S. Cl. ............................................ 440/67; 440/69

(58) Field of Classification Search ............ 440/67–70, 440/47, 38; 60/221; 114/166  
See application file for complete search history.

(56) References Cited

U.S. PATENT DOCUMENTS

| | | |
|---|---|---|
| 23,105 A | 3/1859 | Montgomery |
| 3,476,070 A | 11/1969 | Austen |
| 3,515,087 A | 6/1970 | Stuart |
| 3,744,446 A | 7/1973 | Gibbins |
| 3,811,399 A | 5/1974 | Kobayashi et al. |
| 3,937,173 A | 2/1976 | Stuart |
| 4,015,556 A | 4/1977 | Bordiga |
| 4,288,223 A | 9/1981 | Gonzalez et al. |
| 4,310,319 A | 1/1982 | Fuller |
| 4,505,684 A | 3/1985 | Holden et al. |
| 4,509,925 A | 4/1985 | Wuhrer |
| 4,685,889 A | 8/1987 | Nystrom |
| RE33,165 E | 2/1990 | Whitehead |
| 5,722,866 A * | 3/1998 | Brandt .................. 440/67 |
| 5,890,937 A | 4/1999 | Granger |
| 5,910,032 A | 6/1999 | Gruenwald et al. |
| 6,132,269 A | 10/2000 | Belt |
| 6,475,045 B1 | 11/2002 | Schultz et al. |
| 6,846,210 B1 | 1/2005 | Abella |

* cited by examiner

*Primary Examiner*—Ed Swinehart  
(74) *Attorney, Agent, or Firm*—Malloy & Malloy, P.A.

(57) ABSTRACT

A nozzle drive propulsion assembly for use with a marine craft and incorporating an annularly configured nozzle disposed in surrounding relation to a propeller collectively mounted exteriorly of the marine craft and preferably, at least partially, within an elongate recessed channel formed in the hull. A strut assembly is connected to the nozzle in transverse relation to a trailing open end thereof, downstream of the propeller and in at least partially supporting relation to the propeller. The nozzle includes a collection assembly including a water collecting chamber incorporating a pitot-type structure for directing water into the collecting chamber and along a path of fluid flow in the strut assembly to a thrust member mounted on the strut assembly. A rudder assembly and a deflector structure are secured to an exterior of the nozzle and function to determine the craft's direction of travel.

27 Claims, 10 Drawing Sheets

NOZZLE DRIVE PROPULSION FOR A MARINE CRAFT

CLAIMS OF PRIORITY

The present application is a Continuation-In-Part of U.S. Pat. application having Ser. No. 10/405,325, which was filed on Apr. 2, 2003, incorporated herein by reference, which has matured into U.S. Pat. No. 6,846,210 on Jan. 25, 2005.

BACKGROUND OF THE INVENTION

1. Field of the Invention

This invention is directed to a nozzle drive propulsion assembly for high performance operation of a marine craft and includes a propeller mounted on a distal end of a propeller shaft and surrounded by an annularly configured nozzle and supported by a strut assembly. Components facilitating and directional travel of the marine craft include a thrust mechanism, a rudder assembly and a deflector structure all connected to the nozzle downstream of the propeller and in interruptive relation to the flow of water issuing from the nozzle.

2. Description of the Related Art

Marine propulsion systems vary greatly in both structural and operational features dependent in large part on the intended function and operation of the marine craft, with which they are used. The broad categories of marine propulsion systems incorporating a propeller drive include inboard drive systems, outboard drive systems and a combination or inboard/outboard propulsion units. Historically, propeller drive is perhaps the most commonly used mechanical means of propelling a craft through the water. As such, it is known to provide a shroud or substantially protective structure used in combination with the rotating propeller. Basic to all such shrouded propeller assemblies and at the core of associated propulsion systems is the existence of the shroud or nozzle housing itself. This basic concept was developed by an individual named "Kort" during the mid 1920's. Due to their popularity, shrouded propeller assemblies have been used extensively throughout the years in a variety of different forms and are commonly referred to as Kort nozzles.

Since its conception the Kort nozzle assembly has been extensively modified so as to adapt shrouded propulsion systems to particular categories of marine craft and their intended function, as set forth above. Even earlier than the extensive implementation of the Kort nozzle into marine propulsion systems, as currently contemplated, various protecting devices have been used in combination with the propeller. Such known devices include a basic hollow cylinder used in combination with a propeller being structured to serve as a maneuvering mechanism for an inboard motor.

In addition to the above, it is universally accepted that propellers are an integral part of outboard motor drive systems which are primarily intended to propel a variety of different smaller water craft. However, it was quickly discovered that an unguarded propeller, when rotating at high speeds, is frequently subjected to extensive and sometimes irreparable damage. Accordingly the use of the Kort nozzle, as well as other types of propeller shrouds was initially used to provide protection to the rotating propeller. More currently, the advancing technology in marine craft has led to structural modifications aimed at developing increased thrust while still incorporating the basic structure of protective propeller shrouds. In spite of the various attempted structural modifications, the resulting operative features are normally productive only in a relatively limited performance range such as the development of sufficient thrust to allow travel of a water craft at up to approximately 12 knots. As such, shrouded propellers incorporating a nozzle type structure are commonly used on heavy-duty water craft such as tug boats, towing barges, etc.

Accordingly, there is a recognized need in the marine industry for an efficient, effective propulsion system preferably incorporating the advantages offered by a shrouded propeller assembly and including structural modifications beyond those used in known propulsion systems. Further, such an improved propulsion system should have an extended operable life and be readily adaptable for use on a variety of different water craft, while still accomplishing sustained, high performance operation at speeds not previously contemplated.

SUMMARY OF THE INVENTION

The present invention is directed to a propulsion system for a marine craft which may be more accurately described as a nozzle drive propulsion assembly. As such, a preferred embodiment of the present invention includes various operative components such as, but not limited to, a nozzle, propeller shaft, propeller, strut assembly, all assembled as part of the marine craft during its original manufacture. However, with minimal structural and functional modifications, the nozzle drive propulsion assembly of the present invention could comprise a retrofit installation for existing marine craft. In this latter preferred embodiment a retrofit installation would be dependent, at least to a certain extent, on the shape and overall structuring of the hull, transom, etc.

As will also be explained in greater detail, the unique structuring of the nozzle drive propulsion system is particularly adaptable for use with a marine craft generally in the range of 18' to 45' in length and results in high performance operation of such craft and a top end travel speed in the range of approximately 25 to 30 knots. Further, a nozzle drive propulsion system of the present invention would only require being powered by a relatively small, fuel efficient diesel engine, rather than the single or dual hi-powered engines found in conventional marine craft which are designed and intended to operate within the top end speed range, as set forth above.

Structural and operational advantages relating to the use of the nozzle drive propulsion assembly include the possibility of eliminating complicated transmission assemblies, water pumps for cooling the power plant, impellers, belts, and other associated components normally provided to facilitate operation of conventional drive assemblies and associated propulsion systems. Finally, efficiency of operation would be increased to the extent that fuel consumption would be approximately one-third of the normal amount of fuel consumed under various operating conditions, especially with a conventional outboard engine. Also, the operable life expectancy of the propulsion assembly of the present invention would be at least four times that of a conventional outboard engine.

Accordingly, the nozzle drive propulsion system of the present invention comprises an elongated propeller shaft preferably connected to an inboard drive assembly of the type set forth above. The propeller shaft extends outwardly through the hull to an exterior location. A distal end of the propeller shaft has the propeller mounted thereon so as to rotate therewith in accordance with the conventional operation of a propeller and a propeller shaft combination. As set forth above, the nozzle drive propulsion system of the present invention, preferably being part of the original manufacturer of the marine craft, would be mounted in an elongated recessed channel formed in the hull and extending along at least a portion of the length thereof. The recessed channel would include an open rear end which is preferably, but not necessarily, in substantial alignment with the transom area of the marine craft. As such, a length of the propeller shaft, normally comprising a majority of such length, extends along the interior of the recessed channel and terminates substantially adjacent the rear open end. Similarly, the propeller, being secured to the propeller shaft is disposed substantially adjacent the open end of the channel.

Another structural feature of the present invention comprises a strut assembly including at least one strut member secured to the nozzle substantially adjacent to the trailing end thereof, downstream of the propeller. By virtue the relative positions of the propeller and the strut assembly, the propeller will be exposed to "clear water" thereby restricting cavitation during continuous operation of the propeller, at least in part because of the funneling effect of the nozzle as well as the down stream location of the strut assembly.

In addition, the transverse location of the strut assembly facilitates its supporting engagement with the propeller shaft and accordingly the propeller mounted on or substantially adjacent to the distal end thereof. Therefore, the strut assembly includes a mounting portion preferably disposed at substantially a mid-portion thereof. The mounting portion is structured to be connected to the extremity or outward portion of the distal end of the propeller shaft so as to facilitate free rotation of the propeller shaft relative to the strut assembly.

The structural features of the nozzle drive propulsion assembly of the present invention further include, in at least one preferred embodiment, the provision of a thrust mechanism preferably secured to the mounting portion of the strut assembly. Moreover, the thrust mechanism comprises at least one rotating member or disk component having at least one exterior surface thereof configured to function as an impeller in order to direct pressurized water flow outwardly from the strut assembly. The rotating impeller is connected to the propeller shaft so as to rotate therewith concurrently to the rotation of the propeller.

In addition the nozzle is structured to facilitate pressurized flow or passage of water through the thrust mechanism by means of a collection assembly. The collection assembly includes a collection chamber preferably integrally formed on the interior surface of the nozzle and is more specifically defined by means of an annular channel. Further, a pitot structure is also included in the collection assembly and disposed in overlying at least partially covering relation to the annular collection chamber. The pitot structure comprises an apertured construction along at least a portion of its length through which pressurized water travels, due in part to the operation of the propeller and funneling effect of the nozzle. A path of fluid flow is established between the collection chamber of the nozzle and the thrust mechanism by a channeling or conduit structure formed in the strut assembly, as will be more fully explained hereinafter. A pressure regulator may also be associated with the strut assembly and is disposed and structured to facilitate water cooling and lubrication of the thrust mechanism as well as the engine defining the drive assembly of the marine craft. An adequate flow of water created in part thereby, eliminates the need for water pumps or associated operative components normally used to supply cooling and lubricating water to the drive engine, transmission and other operative components requiring dissipation of excessive heat.

Other features of the nozzle drive propulsion system of the present invention includes a rudder assembly also secured directly to the nozzle, rather than to a transom or other portion of the marine craft. The rudder assembly includes at least one rudder vane or blade pivotally secured exteriorly on the nozzle and disposed immediately adjacent the trailing end thereof. In such an operative position, selective orientation of the rudder blade can be controlled by a pulley and cable assembly and/or like mechanical linkage operative from the interior of the marine craft.

Yet additional structural features of the present invention include a deflector assembly which eliminates the need for complicated transmission components normally found in marine craft of the types set forth above. The deflector assembly includes at least one deflector element pivotally or otherwise movably secured to the exterior of the nozzle and capable of being selectively oriented between a closed or covering position relative to the trailing end of the nozzle or an open, spaced apart position relative thereto. As such, positioning of the deflector member will control directional movement and other maneuvering of the marine craft in at least forward, reverse and neutral directions.

Therefore, the nozzle drive propulsion system of the present invention provides an efficient and effective means of propelling a marine craft, especially during continuous, high performance operation, and at significantly greater speeds than is normally accomplished using conventional outboard propeller drive systems. Additional advantages include safety and environmental compatibility due to the "shrouding" of the propeller, by the annularly configured nozzle. Finally, the elimination of many operative components normally associated with conventional marine craft and cooperative drive assemblies extends the operable life of the propulsion system of a marine craft well beyond the operable life span which is currently available.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
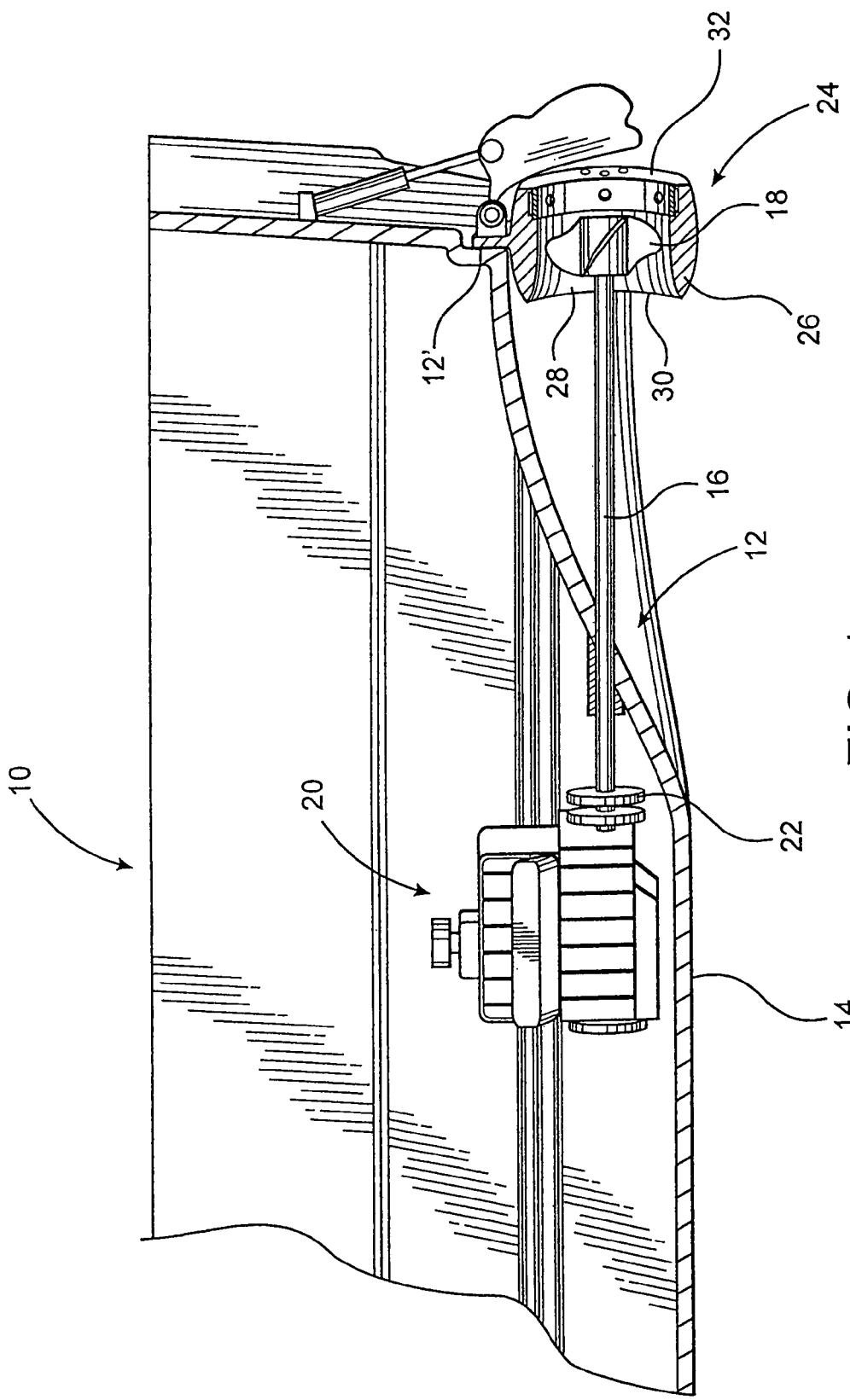
FIG. 1 is a sectional view in partial cutaway of the nozzle drive propulsion system of the present invention shown in its operative position on a marine craft.
Figure 14:
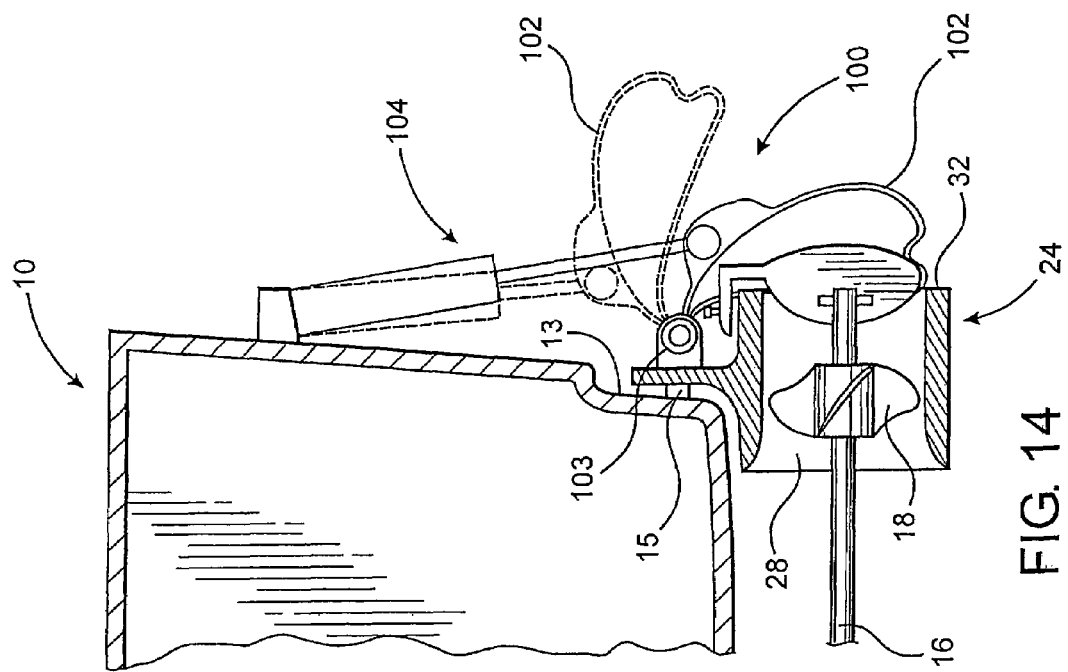
FIG. 14 is a longitudinal and sectional view in partial cutaway of a deflector assembly of the present invention depicted in different operative positions by solid and broken lines.

As shown in the accompanying drawings, the present invention is directed to a propulsion system for a marine craft 10 shown in section and partial cutaway in FIGS. 1 and 14. The marine craft 10 is preferably, but not necessarily, in the range from about 18' to 45' in length and having proportionally dimensioned other structural components. As will be more fully explained herein after the propulsion system of the present invention is preferably mounted on the marine craft 10 as part of the original manufacture thereof. However, with minimal or no additional structural modification, various operative components of the present invention may be retrofitted on an existing marine craft.

When installed as part of the original manufacture, a most preferred embodiment of the present invention comprises the marine craft 10 having an elongated recessed channel, generally indicated as 12, formed in the hull portion 14 thereof as best shown in FIG. 1. An elongated propeller shaft 16 has a propeller 18 secured substantially adjacent to the distal end thereof and affixed so as to rotate therewith. As such, a significant length of the propeller shaft 16 is disposed outboard of the marine craft 10 and extends substantially within and along a length of the recessed channel 12. Similarly the propeller 18 is secured to the propeller shaft 16 at a location substantially adjacent to or directly associated with an open end 12' of the recessed channel 12. Further, propeller shaft 16 is connected in driven relation to a drive assembly generally indicated as 20 preferably by means of a flexible coupling 22. The efficient operating capacity of the present invention allows for a significantly smaller, more efficient drive assembly 20 to be incorporated within the marine craft 10, such as a relatively small diesel engine.

For reasons to be clearly evident hereinafter, the propulsion system of the present invention may be more accurately described as a nozzle drive propulsion assembly. Accordingly, in addition to the propeller shaft 16 and the propeller 18, the nozzle drive propulsion assembly of the present invention includes a nozzle generally indicated as 24. The nozzle 24 comprises a continuous, annularly configured peripheral wall 26 disposed in surrounding relation to a hollow interior 28 and terminating in oppositely disposed open leading and trailing ends 30 and 32 respectively. Further, the nozzle 24, including the hollow interior 28 is sufficiently dimensioned and configured to at least partially enclose or shroud the propeller 18 on the interior thereof and between the leading and trailing open ends 30 and 32. It should be apparent therefore that the relative dimensions of the hollow interior 28, as at least partially defined by the inner surface of the peripheral wall 26, is such as to provide sufficient clearance during high-speed continuous operation (rotation) of the propeller 18.

Figure 1A:
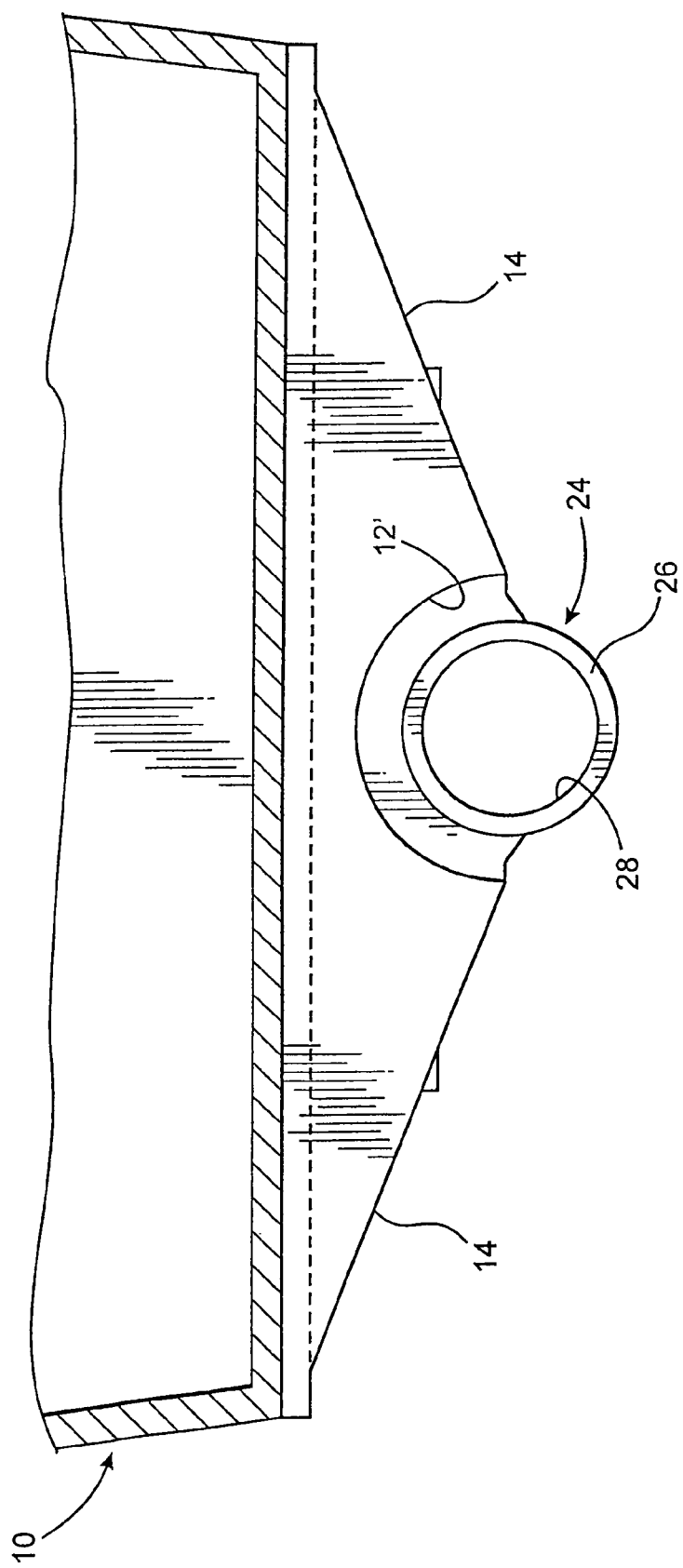
FIG. 1A is a rear view in partial cutaway of the marine craft of FIG. 1 disclosing the transom and hull structure thereof with the placement of the nozzle schematically represented.

As represented in both FIGS. 1 and 1A, the nozzle 24 is secured to the marine craft 10 generally adjacent a lower portion of the transom 13 and extends at least partially below the keel portion of the marine craft 10. Further, the nozzle 24 is mounted adjacent to the open end 12' of the elongated recessed channel 12 formed in the hull 14 so as to be in receiving, funneling relation to water passing along the hull 14 and through the recessed channel 12. Means of securing the nozzle 24 to the transom portion 13 may of course vary such as including any type of fixed, removable and/or integral connection facility, as at 15 (see FIG. 14).

Figure 2:
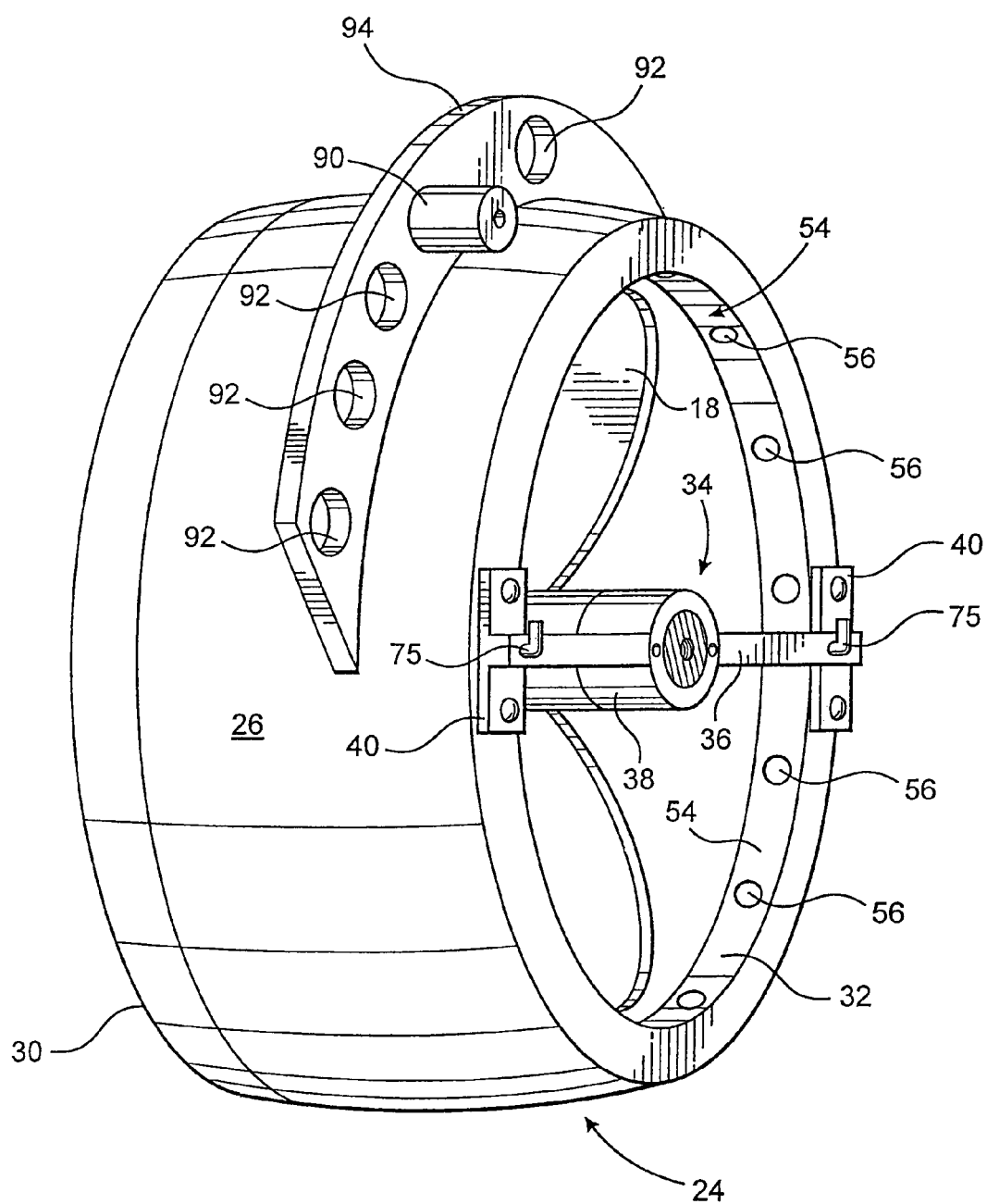
FIG. 2 is a perspective view of a nozzle and propeller component associated with the preferred embodiment of FIG. 1.
Figure 16:
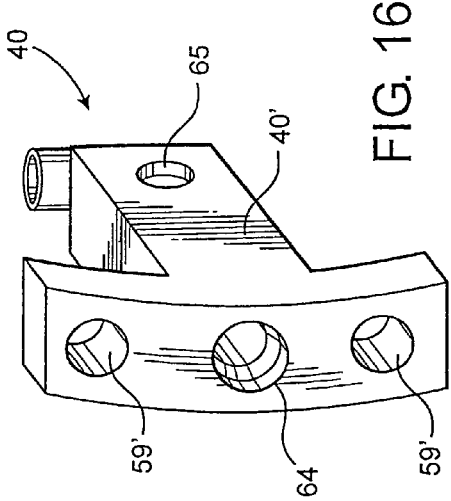
FIG. 16 is a perspective view of the embodiment of FIG. 15.
Figure 15:
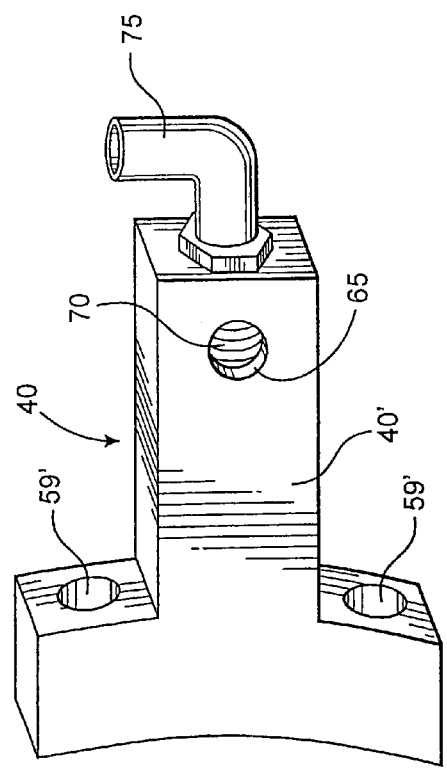
FIG. 15 is a perspective view of a mounting component of the thrust mechanism of the preferred embodiment of the present invention.
Figure 17:
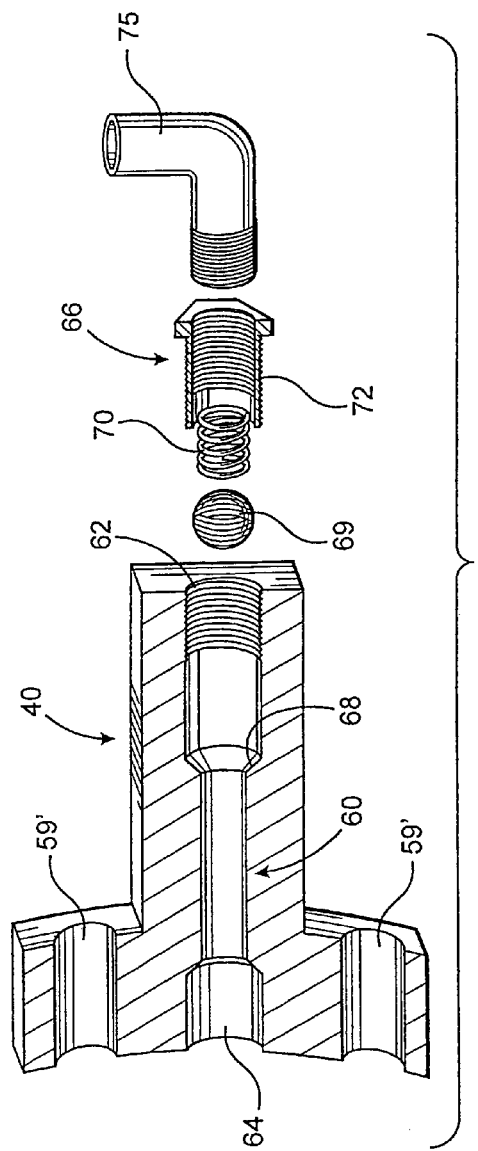
FIG. 17 is an exploded view of the embodiment of FIG. 15 showing operative components of a pressure sensor device incorporated within at least one preferred embodiment of the present invention.

Another structural feature of the nozzle drive propulsion assembly of the present invention includes a strut assembly generally indicated as 34. The strut assembly 34 includes a strut member 36 having an elongated configuration sufficient to extend transversely to the trailing end 32 as clearly depicted in FIG. 2. The strut member 36 is secured directly to the nozzle 24 by means of oppositely disposed end brackets 40 interconnecting the opposite ends of the strut member 36 to exterior peripheral portions of the trailing open end 32. Additional structural details of the mounting brackets 40 are more fully described hereinafter with reference to FIGS. 15 through 17. The strut assembly further includes a mounting portion 38 rotatably engaging and at least partially supporting the propeller shaft 16, as well as the propeller 18 secured thereto.

Figure 7:
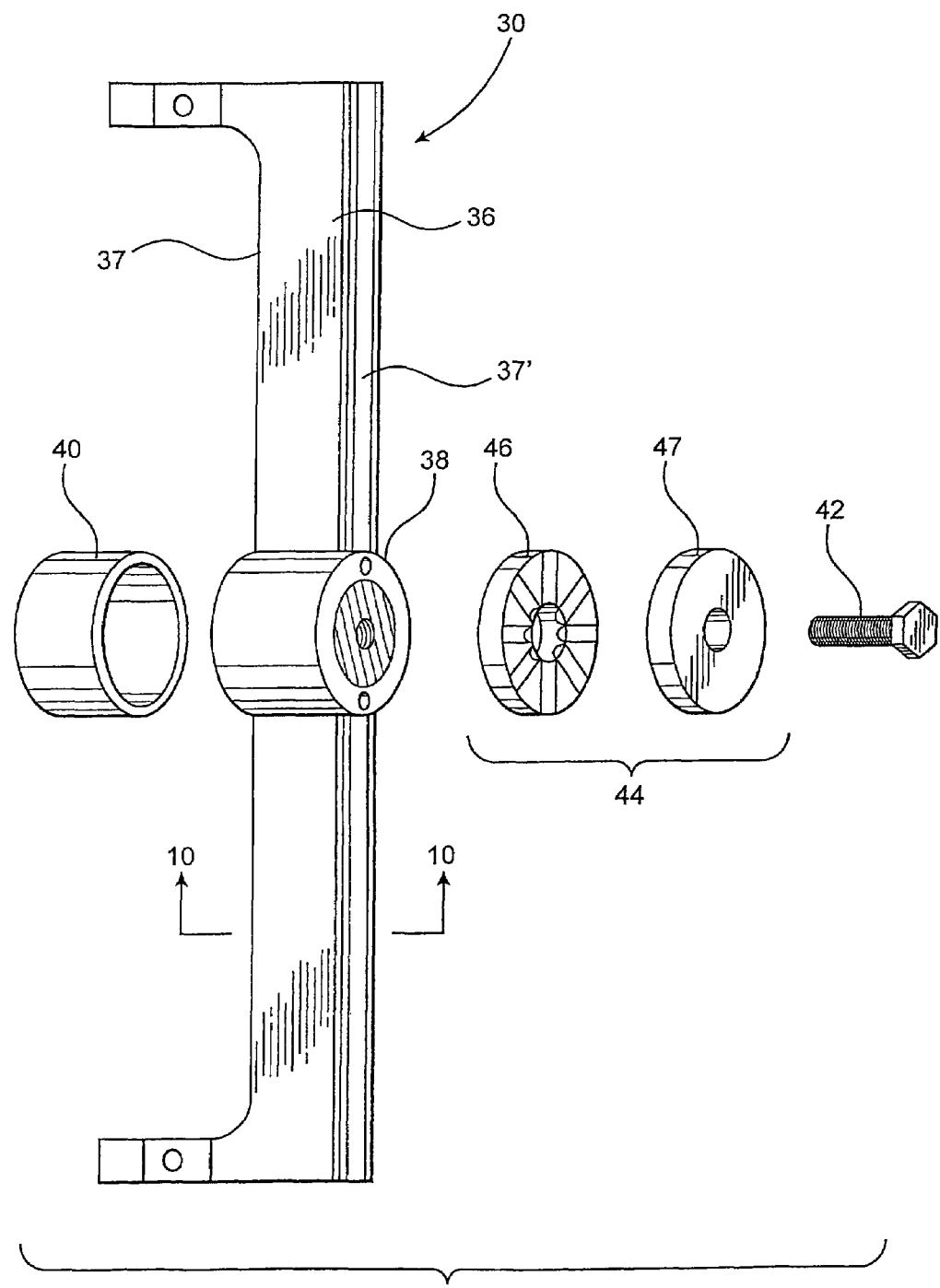
FIG. 7 is an exploded view of a strut assembly and a thrust mechanism associated therewith and shown in an unassembled orientation.
Figure 8:
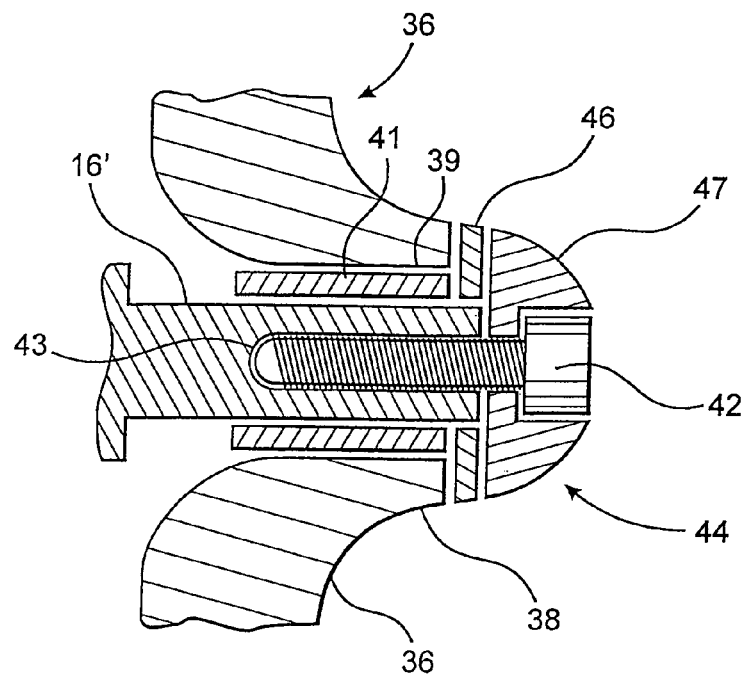
FIG. 8 is a sectional view in partial cutaway of the thrust mechanism of FIG. 7 shown in an assembled orientation.
Figure 9:
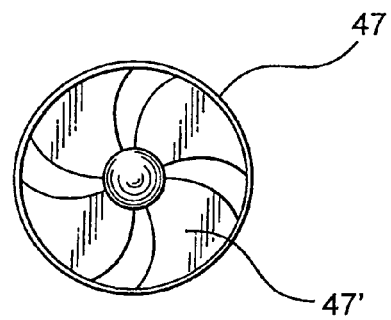
FIG. 9 is a rear view of a impeller structure associated with the thrust mechanism of the embodiments in FIGS. 7 and 8.

With reference to FIGS. 7 through 10, the mounting assembly 38 includes an opening as at 39 for at least partial receipt of the extremity of the distal end 16' of the propeller shaft. A bushing 41 is disposed in surrounding relation to the distal end 16' and a bolt or a shaft screw 42 passes through an internally threaded socket as at 43 to define a secure connection. As such, the propeller shaft 16 is rotatably secured to the strut member 36 by having the extremity of its distal end 16' passing through the opening 39. As will be explained in greater detail hereinafter a thrust mechanism 44, also disclosed in FIGS. 7 through 9, is directly associated with and mounted on the strut assembly 34 and specifically on the mounting portion 38 thereof.

Figure 10:
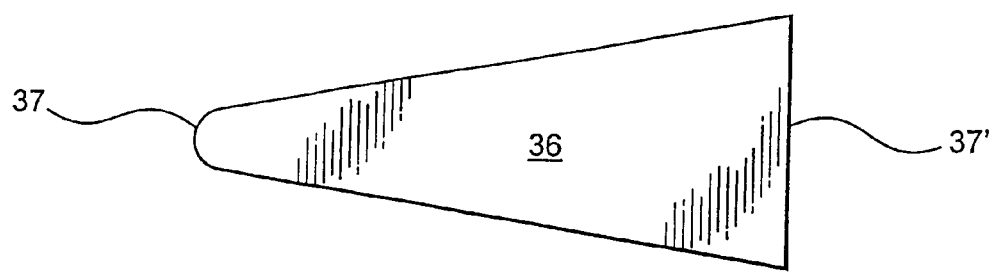
FIG. 10 is a sectional view taken along line 10—10 of FIG. 7.

The thrust mechanism 44 includes a first disk or like member 46 fixedly secured to the mounting portion 38 generally about an outer end thereof. The thrust mechanism 44 also includes a rotatable disk 47 which is secured to the distal end 16' of the propeller shaft 16 by virtue of the interconnecting bolts or shaft connector 42. Accordingly the disk 47 assuming either the configuration of FIG. 7 or 8, is driven by the propeller shaft 16 and rotates therewith relative to the disk member 46 and the strut member 36. With reference to FIG. 9, the rotatable disk or like structure 47 includes at least one surface, as at 47', specifically configured to serve as an impeller. The impeller 47, 47' forces an outward flow of water from the interior of the thrust mechanism 44, between the disk 46 and the rotatable disk 47. An additional thrust component is thereby added to the propulsion of the marine craft 10 by virtue of the outwardly directed fluid force caused by rotation of the rotating impeller member 47. Further structural features of the strut member 36 may include a cross-sectional configuration as shown in FIG. 10 including a substantially wedge-like shape. As such, the leading longitudinal edge 37 has a lesser transverse dimension than the trailing edge 37' in order to facilitate passage of the strut assembly 34 through the water with minimum resistance.

Figure 12:
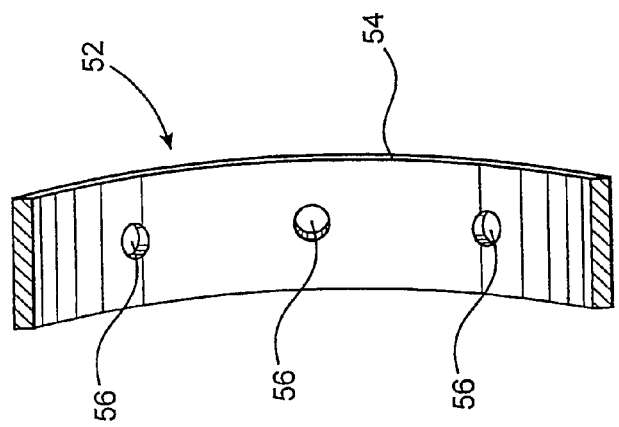
FIG. 12 is a perspective view in partial cutaway of a pitot structure associated with the nozzle 11.
Figure 13:
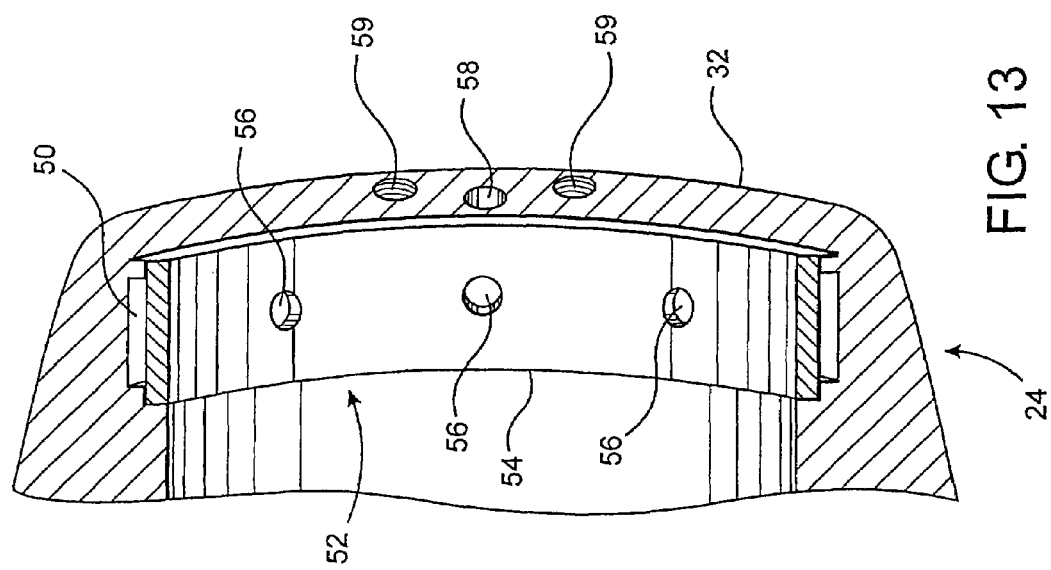
FIG. 13 is assembled view of the embodiment of FIGS. 11 and 12.

In order to direct water to the thrust mechanism 44, the strut member 36 includes appropriate channeling or conduit structure defining a path of fluid flow from the nozzle 24 to the thrust mechanism 44. With primary reference to FIGS. 11 through 13, the nozzle 24 includes a collection assembly generally indicated as 48 formed therein or otherwise directly mounted thereon. The collection assembly 48 includes a collection chamber 50 integrally or otherwise formed within a recessed location on the interior surface of the peripheral wall 26. In at least one preferred embodiment of the present invention, the collection chamber 50 may comprise a continuous, annular configuration. Alternatively, the collection chamber 50 may include a plurality of chamber segments rather than a continuous annular configuration. In either embodiment, the collection chamber 50 is located substantially adjacent to the trailing open end 32 of the nozzle 24 and further includes a pitot-type structure generally indicated as 52. In a preferred embodiment, the pitot-type structure 52 includes a ring or like member 54 having an apertured construction. The apertured construction of the ring member 54 comprises a plurality of spaced apart apertures 56 extending completely through the member 54 so as to define fluid communication between the interior 28 of the nozzle 24 and the interior of the collection chamber 50. With reference to FIG. 13, the pitot-type ring or member 54 is shown in its operative position in overlying at least partially covering relation to the collection chamber 50 and may be press fitted or otherwise disposed in such a covering location.

Additional structural features of the nozzle include the provision of at least one but preferably a plurality of openings or passages 58 extending through the periphery of the trailing open end 32 of the nozzle 24. Preferably, each of the openings or passages 58 is disposed in aligned, fluid communicating relation with the interior of one of the mounting end brackets 40 by means of an opening or passage 64 (see FIGS. 15 through 17) formed in the mounting brackets 40. As discussed in detail above, the mounting brackets 40 are connected to the opposite ends of the strut member 36 and serve to secure the strut member 36 in its operative, transverse position relative to the trailing end 32 as disclosed in FIG. 2. Additional mounting apertures 59 and 59' (see FIGS. 11 and 13) are provided to facilitate securement of the end mounting brackets 40 in their operative location on the trailing end 32 of the nozzle 24. Such securement comprises bolts or other appropriate connectors passing through aligned mounting apertures 59 and 59' respectively disposed on the trailing end 32 of the nozzle 24 and on the end mounting brackets 40. However, the through openings or passages 58 are disposed in fluid communicating relation with the interior of the collection chamber 50 and the interior of the end brackets 40, through the openings 64. The passage of water is thereby forced from the collection chamber 50 into the through passages or openings 58 and 64, into and through the end mounting brackets 40 and through a path of fluid flow disposed on or within the strut member 36. The path of fluid flow of the strut member 36 may be defined by appropriate channeling or conduit structure, as described above.

In operation, the water passing through the interior 28 of the nozzle 24 is pressurized due to the funneling effect of the nozzle as well as the rotation of the propeller 18. As such, the water will pass into the plurality of apertures 56 of the pitot-type structure 54 and into the interior of the collection chamber 50. The forced flow of water will continue to travel, through the channel openings 58 and 64 into and through a channel 60 within the end mounting brackets 40 and therefrom along the path of fluid flow within the strut member 36 to the thrust mechanism 44, described in detail with reference to FIGS. 7 through 9. In that the impeller member 47 is driven by and therefore rotates with the propeller shaft 16, water being delivered along the aforementioned path of fluid flow will be thrust outwardly from the thrust mechanism 44 between the stationary disk member 46 and the rotating impeller member 47. An additional thrust factor will thereby be added to the nozzle drive propulsion system facilitating high-performance operation and travel of the marine craft 10.

As set forth above and with primary reference to FIGS. 2, 11 and 15 through 17, the end mounting brackets 40 serve to connect opposite ends of the strut member 36 in an intended operative position relative to the open trailing end 32 of the nozzle 24. Moreover, in at least one preferred embodiment one or both of the end brackets 40 include the aforementioned fluid channel generally indicated as 60 having opposite openings or passages 62 and 64. A pressure regulator assembly is generally indicated as 66 and is mounted in cooperative relation to the fluid channel 60. The pressure regulator assembly 66 includes a valve structure including a valve seat 68 and a moveable valve member 69 in the form of a ball or other structure configured to effectively seal and restrict passage of fluid through the channel 60 when the valve member 69 engages and seals the valve seat 68. A spring or biasing member 70 is mounted within a receiving bushing 72 in engaging relation to the valve member 69.

Upon a forced water flow passing from the collection chamber 50 through the opening or passage 58 and into the end brackets 40 by means of opening 64, the water will continue to flow along the channel 60. The water inflowing into the end brackets 40 should have sufficient pressure to dislodge the valve member 69 against the biasing force 70 thereby allowing the water to flow along the entire length of the channel 60, beyond the valve seat 68 and through a strut inlet port 65 located on an innermost surface or side 40'. Water flow exiting the bracket 40 through the inlet port 65 will pass into and along the aforementioned path of fluid flow defined by appropriate channeling or conduit disposed within or on the strut member 36 as set forth above. Such path of fluid flow will thereby direct cooling and lubricating water from the mounting brackets 40, through the inlet ports 65 and along the path of fluid flow into the thrust assembly 44 described in detail above with reference to FIGS. 7 through 10.

Other structural features associated with one or more of the end mounting brackets 40 may include an adapter 75. The adaptor 75 may be connected to the opening inlet 62 by being threaded or otherwise attached to the busing 72. The adaptor 75 is thereby disposed exteriorly of the corresponding end mounting bracket 40 and structured to receive water under pressure from an external source, such as a conventional water hose connected directly to the adaptor 75. The supply of water flow from an external source, through the adapter 75 is provided for purposes of cleaning, lubrication, cooling, etc, in situations where water is not necessarily supplied from the collection chamber 50 as described above. Further, upon the attachment of a conventional water hose to the adapter 75, the valve 69 will be forced into sealed engagement with the valve seat 68 thereby directing the water flow from the adapter 75 out through the inlet port 65 and along the path of fluid flow, to the thrust assembly 44 associated with the strut member 36.

Figure 11:
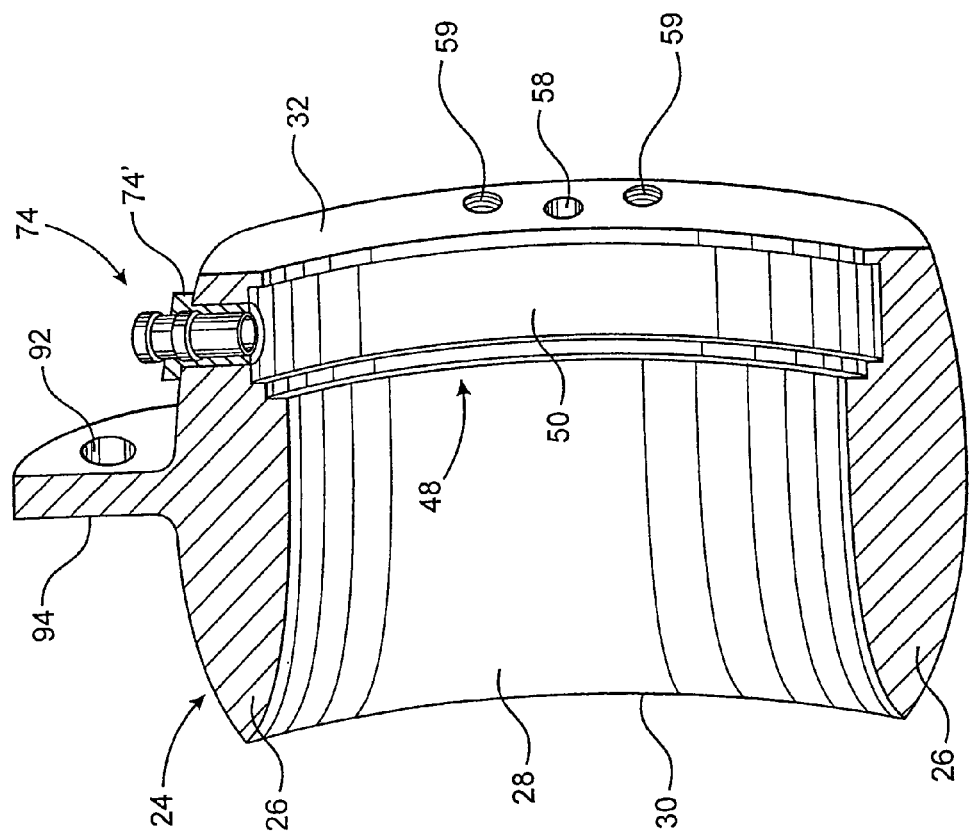
FIG. 11 is a sectional view of the nozzle associated with the embodiment of FIGS. 1 through 3.

Again, with primary reference to FIG. 11 additional operative and structural features of the nozzle assembly 24 include the providing of cooling and lubricating water to the drive assembly 20. More specifically, water within the collection chamber 50 is forced outwardly through the openings or passages 58 and into the end mounting brackets 40, as set forth above. However, in addition water flow is also directed outwardly through a water takeoff generally indicated as 74 which may be mounted on the nozzle assembly 24 by means of a bushing or like adaptive connector 74'. Although not shown, an appropriate conduit or like structure serves to direct fluid flow issuing through the water takeoff 74 to the appropriate parts of the drive assembly 20 for purposes of lubricating, cooling, etc., as set forth above.

Figure 3:
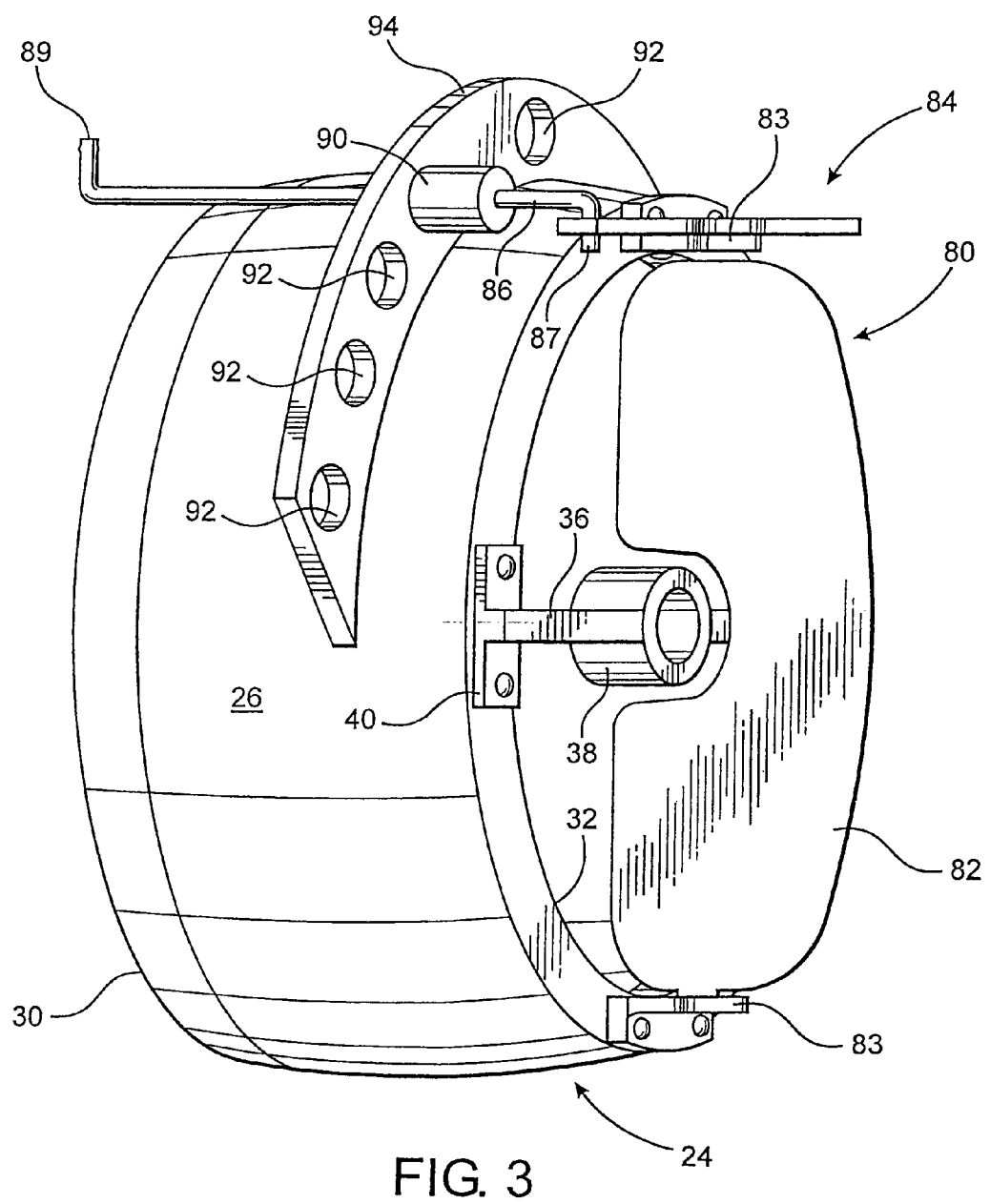
FIG. 3 is a perspective view of the embodiment of FIG. 2 with a rudder assembly mounted in an operative position.
Figure 4:
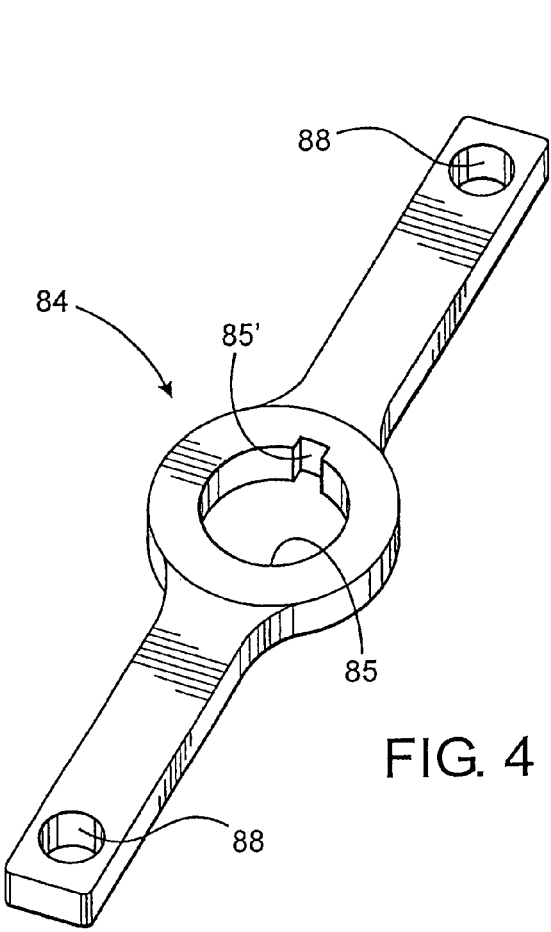
FIG. 4 is a perspective view of one component associated with the rudder assembly of the embodiment of FIG. 3.
Figure 5:
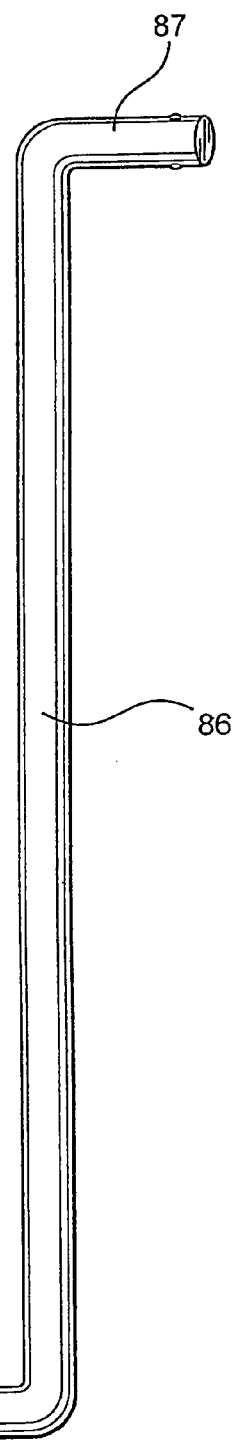
FIG. 5 is another component of the rudder assembly.
Figure 6:
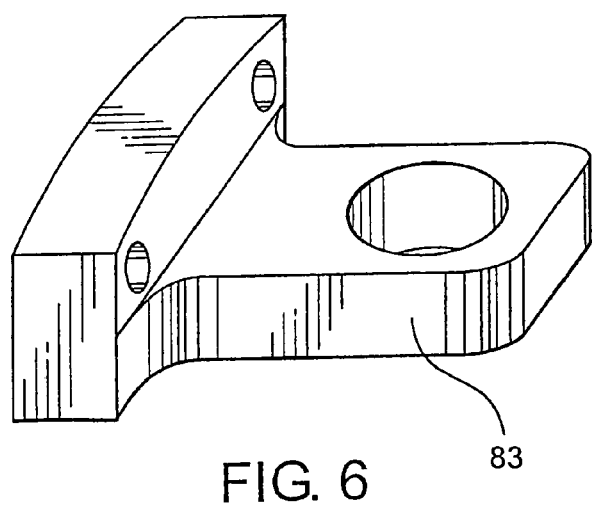
FIG. 6 is mounting bracket associated with the rudder assembly.

Other operative and structural features of the nozzle drive propulsion system of the present invention include the provision of a rudder assembly generally indicated as 80 in FIG. 3. The rudder assembly 80 includes at least one rudder vane or blade 82 adjustably and/or pivotally connected directly to the nozzle 24 as by connecting brackets 83 secured to the outer periphery of the trailing open end 32 at substantially opposite ends of the rudder plate 82. In addition a steering yolk member 84 is shown in detail in FIG. 4 and includes a central portion having a connecting opening as at 85 secured to one end of the rudder blade 82 such as by a key-type connection inserted within key way 85'.

Each of the opposite ends of the steering yolk 84 is connected to a different one of two steering shaft segments 86, each having one end 87 pivotally or otherwise movably mounted within one of the end openings as at 88. The opposite end of each steering shaft segment 86, as at 89, is secured to a cable assembly which extends into the interior of the marine craft 10 in operative attachment with an appropriate steering mechanism, such as a steering wheel or the like. Each steering shaft segment 86 passes through a corresponding supporting bushing 90 mounted on or extending through an appropriately positioned aperture 92 formed in a connecting plate 94 integrally or otherwise fixedly secured to an exterior surface of the peripheral wall 26. A plurality of such apertures 92 are provided to facilitate mounting or attachment of other operative components in addition to the rudder assembly 80.

Other operational and structural features of at least one preferred embodiment of the present invention comprises a deflector assembly 100 shown in both solid and phantom lines in the embodiment of FIG. 14. The deflector assembly 100 comprises a deflector structure 102 preferably having a bucket like member moveably and/or pivotally attached, as at 103, directly to an exterior of the nozzle 24. As should be apparent, the deflector member 102 is selectively disposed between a closed position, represented in solid lines, and an open position, represented in phantom lines. Adjustable positioning of the deflector member 102 is accomplished by activation of a hydraulic or other fluid operated piston and cylinder assembly generally indicated as 104. The closed position of the deflector member 102 in FIG. 14 effectively overlies and at least partially closes the trailing open end 32 of the nozzle 24 there by maximizing interruption of fluid flow passing through the interior 28 of the nozzle 24. As such the normally "forward thrust" component is re-channeled against the deflector member 102, causing the marine craft 10 to travel in a reverse direction. To the contrary, when in a completely open position the deflector member 102 allows free passage of water through the nozzle 24 and out of the trailing open end 32 thereby providing a positive forward thrust component to the marine craft 10 as intended. Positioning of the deflector member 102 into a variety of different intermediate positions will cause, depending on the ambient conditions, the marine craft 10 to operate in a neutral mode by negating the thrust in either a forward or rear direction of travel.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A propulsion assembly for a marine craft comprising;
   a) a propeller and a propeller shaft connected thereto and to the marine craft,
   b) a nozzle secured to the marine craft and including open leading and trailing ends,
   c) said propeller disposed within said nozzle between said leading and trailing ends, and
   d) a strut assembly connected to an exterior of said nozzle substantially adjacent said trailing end thereof and in supporting relation to said propeller.

2. A propulsion assembly as recited in claim 1 wherein said nozzle is disposed in surrounding relation to said propeller.

3. A propulsion assembly as recited in claim 1 wherein said nozzle comprises a peripheral wall extending between said leading and trailing ends and disposed in surrounding relation to said propeller.

4. A propulsion assembly as recited in claim 3 wherein said peripheral wall comprises a continuous annular configuration.

5. A propulsion assembly as recited in claim 1 wherein said strut assembly is connected to said nozzle downstream of said propeller.

6. A propulsion assembly as recited in claim 1 further comprising a thrust mechanism at least partially mounted on said strut assembly and connected in driven relation to said propeller shaft.

7. A propulsion assembly as recited in claim 6 wherein said strut assembly comprises a path of fluid flow extending from said nozzle to said thrust mechanism.

8. A propulsion assembly as recited in claim 7 wherein said thrust mechanism is structured to generate an outwardly directed fluid flow there through from said strut assembly.

9. A propulsion assembly as recited in claim 8 wherein said thrust mechanism comprises an impeller connected to said propeller shaft and rotatable therewith, said impeller disposed and structured to generate a flow of fluid received from said strut assembly outwardly from said thrust mechanism.

10. A propulsion assembly as recited in claim 1 wherein said nozzle comprises a collection assembly disposed in receiving relation to water passing through said hollow interior of said nozzle.

11. A propulsion assembly as recited in claim 10 wherein said collection assembly comprises a collection chamber formed in said nozzle and a pitot-type structure disposed in at least partially covering relation to said collection chamber.

12. A propulsion assembly as recited in claim 1 further comprising a rudder assembly adjustably secured to said nozzle adjacent said trailing end, said rudder assembly disposed in interruptive relation with a flow of water from said nozzle.

13. A propulsion assembly as recited in claim 1 further comprising a deflector assembly connected to said nozzle and selectively positionable into and out of interruptive relation to a flow of water from said nozzle.

14. A propulsion assembly as recited in claim 13 wherein said deflector assembly comprises as flow deflector moveably connected to an exterior of said nozzle and selectively positionable between a closed position and an open position relative to said trailing end of said nozzle.

15. A marine craft comprising:
   a. a hull including an elongated recessed channel formed therein and including an open end,
   b. a propeller shaft extending along at least a portion of a length of said channel, and a propeller connected to said propeller shaft,
   c. a nozzle secured to said hull at least partially within said channel, said nozzle comprising a hollow interior and open leading and trailing ends communicating therewith,
   d. said propeller disposed within said hollow interior of said nozzle between said leading and trailing ends, and
   e. a strut assembly connected to said nozzle downstream of and in supporting relation to said propeller and said propeller shaft.

16. A marine craft as recited in claim 15 wherein said strut assembly comprises a strut member mounted exteriorly of said nozzle in transverse relation to said trailing end.

17. A propulsion assembly as recited in claim 16 wherein said strut member comprises a path of fluid flow disposed in communicating relation with said nozzle.

18. A marine craft as recited in claim 17 further comprising a mounting portion secured to said strut member and structured to rotationally engage said propeller shaft, said path of fluid flow extending between and in communication with said mounting portion of said nozzle.

19. A marine craft as recited in claim 18 further comprising a thrust mechanism connected to said strut member adjacent said mounting portion and in communication with said path of fluid flow.

20. A marine craft as recited in claim 19 wherein said thrust mechanism is structured to generate a flow of fluid from said path of fluid flow outwardly from said strut member and downstream of said propeller.

21. A marine craft as recited in claim 19 wherein said thrust mechanism is connected in fluid communication with said nozzle for receipt of cooling and lubricating water therefrom.

22. A marine craft as recited in claim 15 wherein said nozzle comprises a collection assembly disposed in receiving relation to water passing through said hollow interior thereof.

23. A marine craft as recited in claim 22 wherein said collection assembly comprises a collection chamber formed in said nozzle and a pitot-type structure disposed in at least partially covering relation to said collection chamber.

24. A marine craft as recited in claim 15 further comprising a rudder assembly adjustably secured to said nozzle adjacent said trailing end, said rudder assembly disposed in interruptive relation with a flow of water from said nozzle.

25. A marine craft as recited in claim 15 further comprising a deflector assembly including a flow deflector moveably connected to an exterior of said nozzle and selectively positionable between a closed position and an open position relative to said trailing end of said nozzle.

26. A marine craft as recited in claim 15 wherein an interconnection between said strut assembly and said propeller shaft is connected in fluid communication with said nozzle for receipt of cooling water therefrom.

27. A marine craft as recited in claim 15 wherein a drive assembly for the marine craft is connected in fluid communication with said nozzle for receipt of cooling water therefrom.

* * * * *